United States Patent
Ricot et al.

(10) Patent No.: US 8,594,266 B2
(45) Date of Patent: Nov. 26, 2013

(54) METHOD FOR SECURING AND CONFINING THE GASKET PLANE OF A VESSEL OF A NUCLEAR REACTOR AND A GASKET FOR APPLYING THIS METHOD

(75) Inventors: Jean-Yves Ricot, Echalas (FR); Florent Ledrappier, Saint Paul Trois Chateaux (FR); Ludovic Morice, Saint-Entienne (FR); David Lombard, Saint Sauveur en Rue (FR); Jean-François Juliaa, Montelimar (FR)

(73) Assignee: Areva NP, Courbevoie (FR)

( * ) Notice: Subject to any disclaimer, the term of this patent is extended or adjusted under 35 U.S.C. 154(b) by 416 days.

(21) Appl. No.: 12/947,428

(22) Filed: Nov. 16, 2010

(65) Prior Publication Data

US 2011/0116588 A1    May 19, 2011

(30) Foreign Application Priority Data

Nov. 18, 2009    (FR) ...................................... 09 58128

(51) Int. Cl.
*G21C 13/00*    (2006.01)
(52) U.S. Cl.
USPC ......................................................... 376/205
(58) Field of Classification Search
USPC ......................................................... 376/205
See application file for complete search history.

(56) References Cited

U.S. PATENT DOCUMENTS

| 3,915,462 | A | 10/1975 | Bruns et al. |
| 4,069,100 | A | 1/1978 | Cooper |
| 5,748,689 | A | 5/1998 | Malmasson |
| 8,376,172 | B2 * | 2/2013 | Allen, Jr. ................... 220/254.1 |

FOREIGN PATENT DOCUMENTS

| DE | 4441474 | 5/1996 |
| EP | 0701260 | 3/1996 |
| FR | 2244106 | 4/1976 |
| FR | 2301072 | 9/1976 |
| GB | 877277 | 9/1961 |
| KR | 20010038819 | 5/2001 |

* cited by examiner

*Primary Examiner* — Timothy A Brainard
(74) *Attorney, Agent, or Firm* — Davidson, Davidson & Kappel, LLC

(57) ABSTRACT

A method including placing around the shoulder of the lid a ring-shaped gasket formed by a metal strip maintained on the vertical wall of the shoulder by self-maintaining members firmly attached to the strip, placing the lid bearing the ring-shaped gasket above the vessel by positioning it at a determined height, carrying out a cleanliness inspection of the gasket plane, lowering and laying the lid on the vessel so that the end side edges of the strip will come into contact with a horizontal wall of the lid and of the vessel flange respectively and attaching this lid on the vessel.

11 Claims, 5 Drawing Sheets

METHOD FOR SECURING AND CONFINING THE GASKET PLANE OF A VESSEL OF A NUCLEAR REACTOR AND A GASKET FOR APPLYING THIS METHOD

This application claims priority to French application FR 09 58128, filed Nov. 18, 2009, the entire disclosure of which is incorporated by reference herein.

The present invention relates to a method for securing and confining the gasket plane of a vessel of a nuclear reactor upon an operation for closing this vessel.

The invention also relates to a ring-shaped gasket for applying this method.

BACKGROUND

Pressurized water nuclear reactors include inside the building of the reactor, a vessel containing the core of the nuclear reactor formed by combustible assemblies, generally of prismatic form, arranged vertically and in a juxtaposed way.

Inside the vessel of the reactor, are arranged internal pieces of equipment in particular ensuring support and maintaining the combustible assemblies of the core of the nuclear reactor.

The vessel of a general cylindrical shape, is formed at its lower portion with a convex bottom and includes an upper end which is closed during the operation of the nuclear reactor by a convex lid. This lid of the vessel is crossed by tubes having a vertical arrangement, called adaptors used for ensuring the passage of extenders allowing displacement of control clusters in certain assemblies of the core.

When the lid is laid on the vessel, it determines a gasket plane formed by a ring-shaped recess made on a flange of the vessel and by a ring-shaped shoulder with a shape matching said recess and made on the vessel lid.

The recess and the shoulder of the vessel flange and of the lid respectively, determine two substantially horizontal planar surfaces facing each other and between which two O-ring gaskets are slightly crushed when the lid is clamped on the vessel.

The lid is attached on the vessel of the reactor by pins which are screwed into the flange of the vessel and which pass through in smooth holes provided in a flange ring of the lid.

These pins are generally in a relatively large number and relatively close to each other, disassembling and reassembling the lid therefore requires unscrewing and screwing of all these pins.

Moreover, during the screwing and unscrewing operations, by means of a tension device, traction is exerted on the pins in order to put them into a pre-stressed condition.

The seal during operation of the reactor between the vessel and the lid is therefore achieved by both of the O-rings, most often in "Inconel" (registered trade mark) or in stainless steel plated with silver. These gaskets are placed in two concentric grooves provided on the planar surface of the shoulder of the lid.

These gaskets bear on the planar surface facing the vessel flange and the spans of these gaskets are machined to as to obtain a perfect surface which does not accept any mark, any flaw.

Tightening the lid with the pins slightly crushes the gaskets, the supporting surface of which is about 1 mm wide and generally of the order of 3 mm.

The recess and the shoulder of the vessel flange and of the lid, respectively, each include a vertical wall delimiting between them a gap after the laying of the lid on the vessel flange.

During operations for reloading a portion of the nuclear reactor, cold shut-down of the reactor is performed and the lid closing the upper end portion of the vessel is disassembled.

After removing this lid, a temporary lid is placed on the vessel by placing a temporary inflatable gasket on the edge of the recess of the flange of the vessel in order to ensure a temporary seal.

During the laying of the lid on the flange of the vessel after reloading the core of the nuclear reactor, the temporary inflatable gasket is removed after performing decontamination of the pool by means of a pressure cleaner.

At the beginning of the operation for tightening the pins, the lid is slightly lifted relatively to the vessel flange due to the force produced by the springs of the combustible assemblies and the clamping ring. So there is a play from about 2 mm to 3 mm between the gaskets positioned below the lid and the gasket span over the vessel flange.

It is found that after maintenance operations a leak was noticed upon closing a vessel of a nuclear reactor and this leak was justified by the probable presence of metal microchips or other particles over the span of the seal gaskets of the vessel flange when clamping pins of the lid on said vessel flange are tensioned by a machine for tightening and loosening the pins.

The formation of these microchips probably results from the friction of the tops of the threads of the pins on the wall of the smooth holes of the lid during the mounting of said pins on the vessel flange with the tightening and loosening machine.

Because of the withdrawal of the temporary inflatable gasket before the operations for screwing the pins, these microchips might have made their way right under the gasket span by passing through the gap made between the shoulder of the lid and the recess of the vessel and reached the span of said gaskets during the phase for screwing the pin.

Upon restarting the unit at a primary pressure of the order of 25 bars and at a temperature of the order of 30° C., a leak may thus occur at the gasket span.

In GB 877,277, an annular C-shaped gasket is known which is placed at the gasket plane formed by the ring-shaped recess made on the flange of the vessel and by the ring-shaped shoulder with a shape mating said recess made in the vessel lid. Each end side edge of the annular gasket is welded on a horizontal wall, of the lid and of the vessel flange respectively.

The annular gasket is welded after laying the lid on the vessel so that during the welding operation, microparticles or foreign bodies may make their way right under the gasket span by passing through the gap.

Further, during a new operation for loading a portion of the nuclear reactor, before removing the lid, at least one of the welding beads has to be removed in situ which considerably complicates the operations, increases the shut-down time of the reactor and generates potentially bothersome chips.

SUMMARY OF THE INVENTION

An object of the invention is to provide a method for securing and confining the gasket plane of a vessel of a nuclear reactor during an operation for closing this vessel with which it is possible by simple means to apply to avoid these drawbacks and prevent migration of solid material particles towards the inside of the vessel of the nuclear reactor.

An object of the invention is therefore to provide a method for securing and confining a gasket plane of a vessel of a nuclear reactor during an operation for closing this vessel in order to prevent migration of solid material particles towards the inside of said vessel, said gasket plane being formed by a ring-shaped recess made on a flange of the vessel and by a ring-shaped shoulder made on a vessel lid and said recess and said shoulder each including a vertical wall delimiting between them a gap after laying the lid on the vessel flange, the shoulder including a horizontal wall provided with two O-ring seal gaskets, characterized in that after having disassembled the lid and having laid this lid on a support, the method consists of:

placing around the shoulder of the lid a ring-shaped gasket formed by a metal strip maintained on the vertical wall of the shoulder by self-maintaining members of said strip, placing the lid bearing the ring-shaped gasket above the vessel by positioning it at a determined height and performing a cleanliness inspection of the gasket plane, lowering and laying the lid on the vessel so that the end side edges of the strip come into contact with a horizontal wall, of the lid and of the vessel flange, respectively, attaching this lid on the vessel flange, and leaving the ring-shaped gasket in place during the whole operating cycle of the reactor.

Another object of the invention is to provide a ring-shaped gasket for securing and confining the gasket plane of a vessel of a nuclear reactor during an operation for closing this vessel in order to prevent migration of solid material particles towards the inside of said vessel, said gasket plane being formed by a ring-shaped recess made on a flange of the vessel and by a ring-shaped shoulder made on a vessel lid and said recess and said shoulder each including a vertical wall delimiting between them a gap, the shoulder including a horizontal wall provided with two O-ring seal gaskets characterized in that the ring-shaped gasket is formed by a metal strip including two end side edges each capable of bearing upon a horizontal wall, of the lid and of the vessel flange, respectively, on the one hand and self-maintaining members of said ring-shaped gasket on the vertical wall of the shoulder of the lid on the other hand.

According to other features of the invention:

self-maintaining members comprise at least two metal tabs opposite to each other and attached on the outer face of the strip facing the vertical wall of the shoulder of the lid, the self-maintaining members comprise several metal tabs uniformly distributed over the perimeter of the strip and attached on the outer face of said strip facing the vertical wall of the shoulder of the lid, each tab is attached on the outer face of the strip by welding and with a thickness comprised between 0.2 mm and 0.5 mm and preferably of the order of 0.25 mm, the strip of the ring-shaped gasket has the shape of a flexible ring with a small thickness comprised between 0.3 mm and 1 min and preferably of the order of 0.5 mm, the strip of the ring-shaped gasket has an L-shaped cross-section including two walls forming between them an angle, respectively an upper wall, the end side edge of which bears upon the horizontal wall of the lid and a lower wall of smaller width than the upper wall and the end side edge of which bears upon the horizontal wall of the vessel flange, the tabs are attached on the outer face of the upper wall of the strip, and the tabs are attached on the outer face of the lower wall of the strip.

BRIEF DESCRIPTION OF THE DRAWINGS

The invention and its advantages will be better understood upon reading the description which follows, given as an example and made with reference to the appended drawings, wherein.

DETAILED DESCRIPTION

Figure 1:
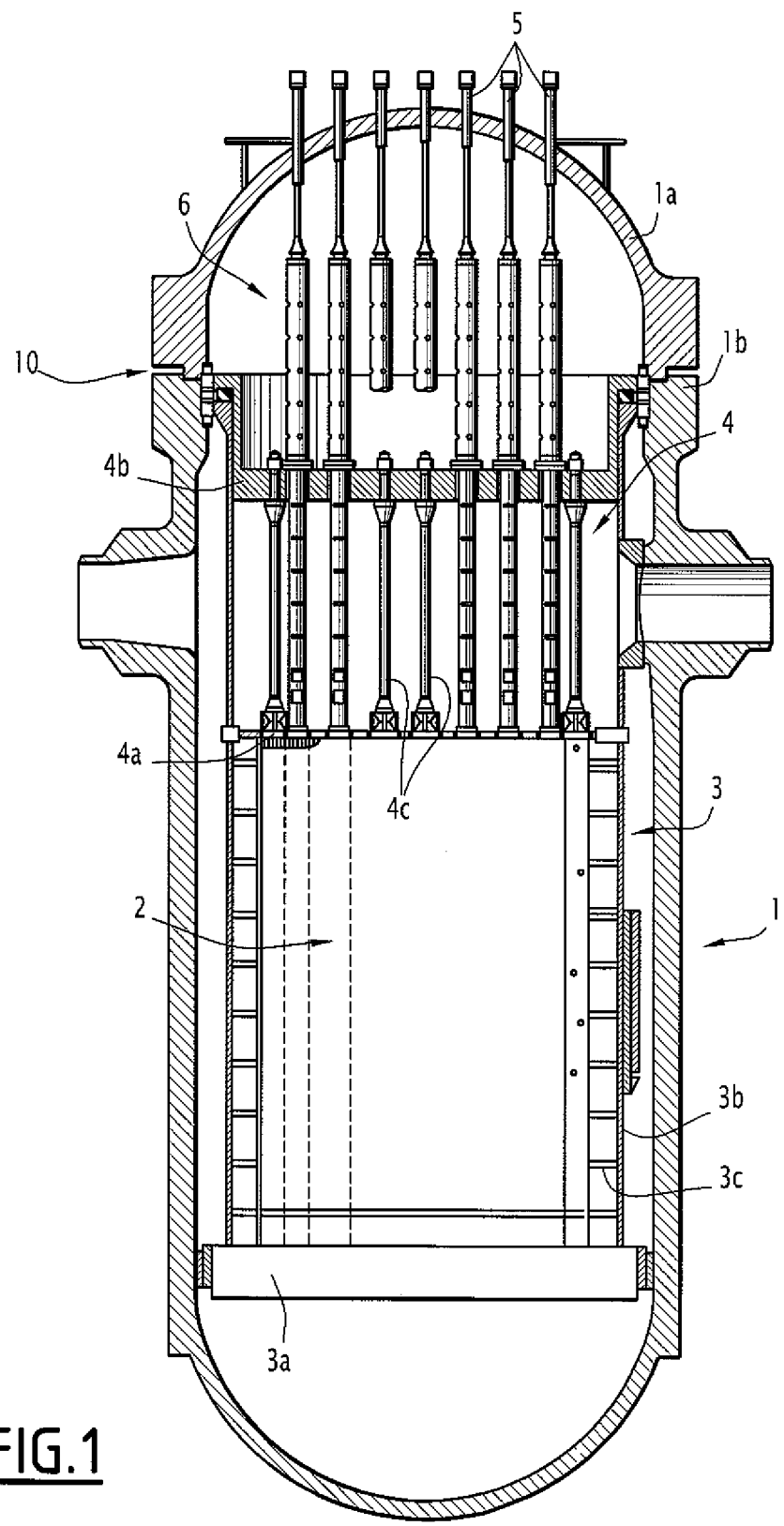
FIG. 1 is a schematic actual sectional view of a vessel of a nuclear reactor containing the core and the internal structures of the reactor.

In FIG. 1, a vessel of a pressure water nuclear reactor is illustrated, designated generally by reference 1.

The vessel 1, of general cylindrical shape, is formed at its lower portion by a convex bottom and includes an upper end which is closed during the operation of the nuclear reactor, by a convex lid 1a bearing upon a vessel flange 1b.

The vessel 1 contains the core 2 of the reactor formed by combustible assemblies, not shown, with a general prismatic shape arranged vertically and in a juxtaposed way inside the internal structures generally designated by the mark 3. These internal structures form the lower internal pieces of equipment of the nuclear reactor.

The lower internal pieces of equipment 3 in particular include a plate for supporting the core 3a, a core shell 3b and a partition 3c for laterally maintaining the core 2 of the nuclear reactor.

On the upper portion of the core 2 lies a second set called upper internal pieces of equipment of the nuclear reactor.

Conventionally, the upper internal pieces of equipment 4 in particular include a lower plate 4a via which the upper internal pieces of equipment rest on the upper portion of the core 2 and which is called an upper core plate.

The upper internal pieces of equipment further include an upper plate of large thickness 4b forming the plate for supporting the guide tubes 6 of the control bars of the nuclear reactor. Spacer columns 4c ensure the assembly and the spacing out of the plates 4a and 4b which are parallel with each other and placed horizontally in the nuclear reactor.

The lid 1a of the vessel 1 is crossed by tubes 5 having a vertical arrangement, called adaptors, used for ensuring the passage of a displacement extender of control clusters in certain assemblies of the core.

The lid 1a delimits with the vessel flange 1b a gasket plane 10.

Figure 2:
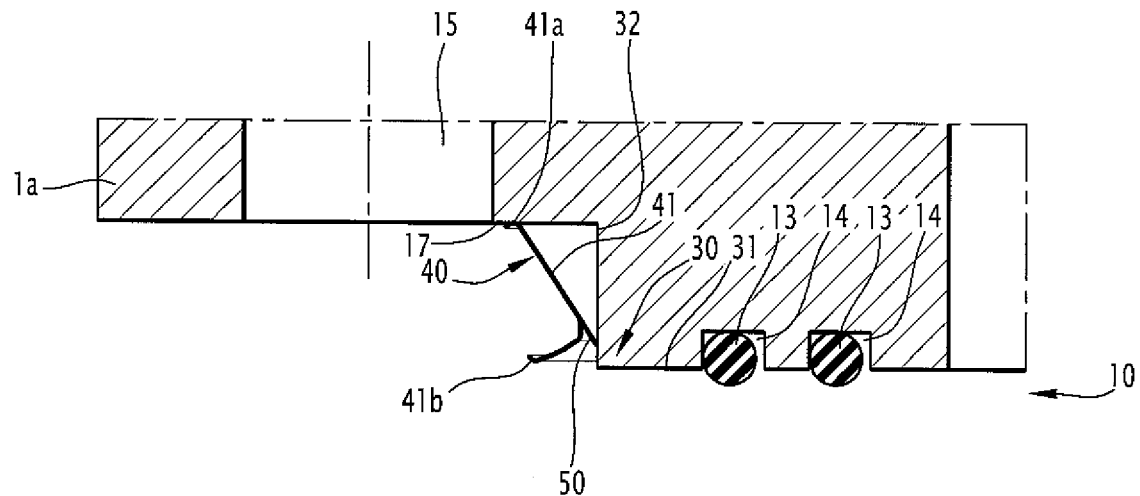
FIGS. 2 and 3 are partial and sectional views in a vertical plane, of the lid with a ring-shaped gasket and of the vessel flange, respectively.
Figure 3:
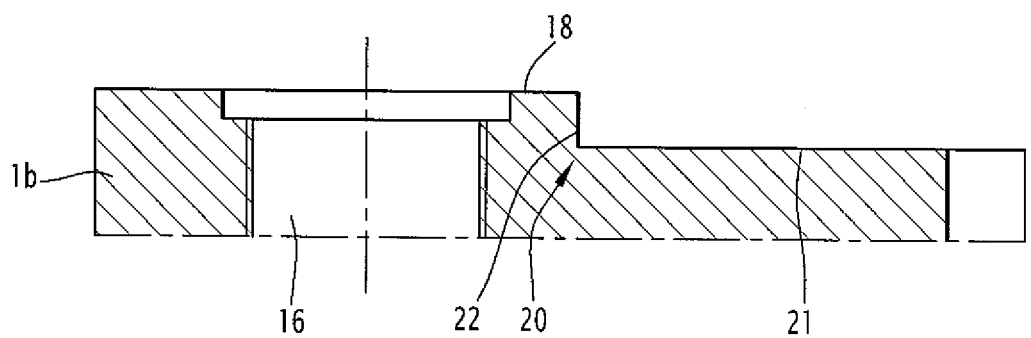

As shown in FIG. 1 and more particularly at a large scale in FIG. 2, this gasket plane 10 is formed by a ring-shaped recess 20 made on the vessel flange 20b and by a ring-shaped shoulder 30 made on the lid 1a of the vessel 1. The recess 20 and shoulder 30 are facing each other.

The recess 20 includes a horizontal wall 21 and a vertical wall 22 and the shoulder 30 includes a horizontal wall 31 facing the horizontal wall 21 and a vertical wall 32 facing the vertical wall 22 of the recess 20.

Figure 5:
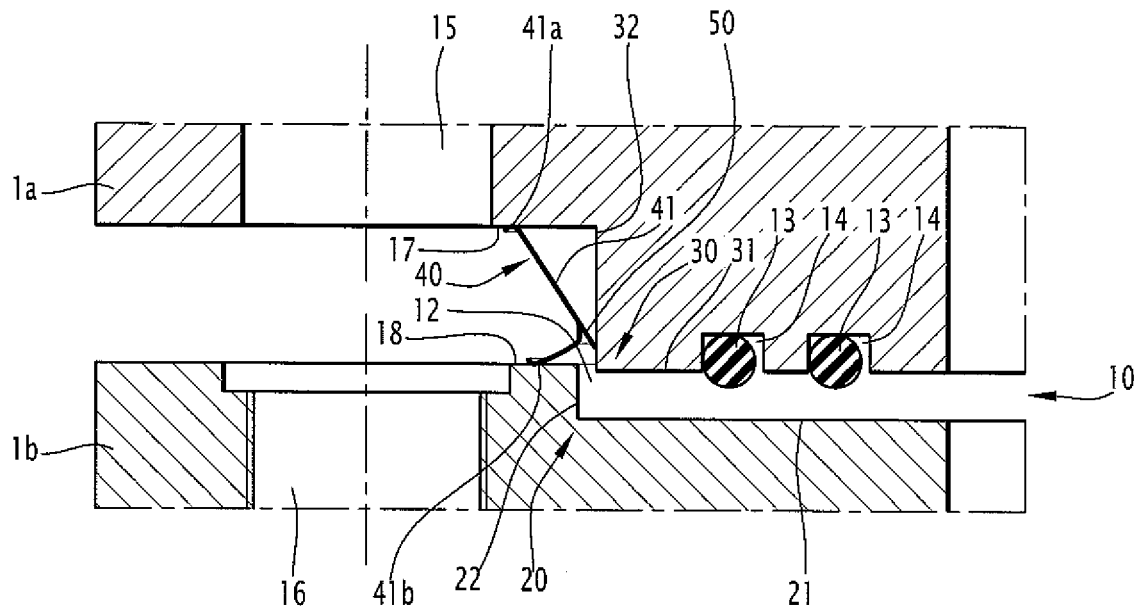
FIG. 5 is a partial sectional view in a vertical plane of the vessel flange and of the lid with the ring-shaped gasket, before tightening the lid.
Figure 6:
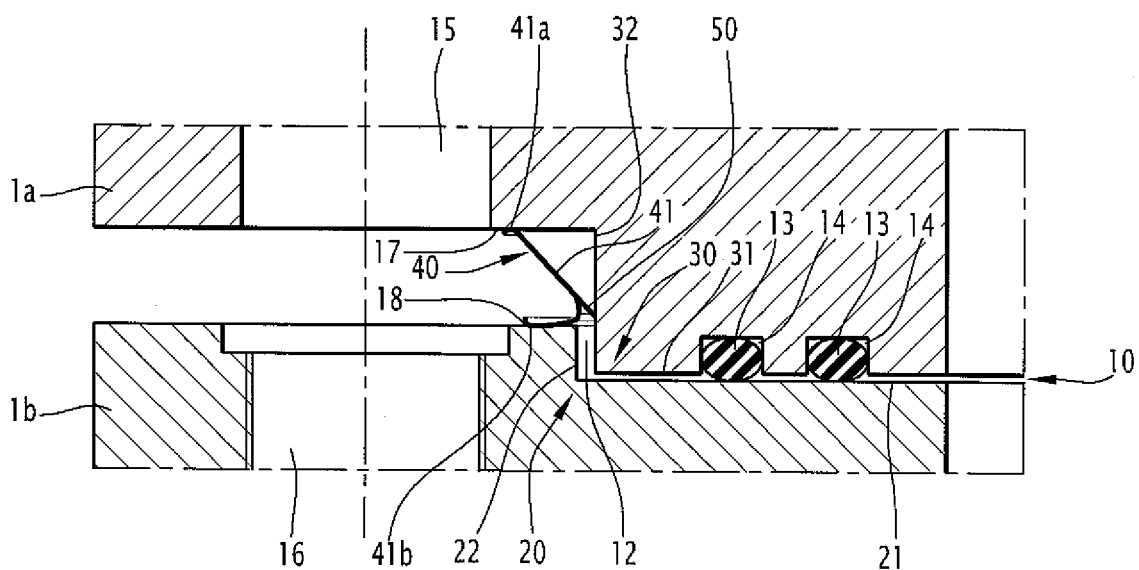
FIG. 6 is a partial and sectional view in a vertical plane of the vessel flange and of the lid with the ring-shaped gasket, after tightening the lid.

The vertical walls 22 and 32 of the recess 20 and of the shoulder 30, respectively, delimit between them a gap 12 after laying the lid 1a on the vessel flange 1b, as shown in FIGS. 5 and 6.

Conventionally, the horizontal wall 31 of the shoulder 30 includes two O-ring gaskets 13 each attached in a groove 14 by means of suitable members like for example lugs, not shown.

The O-ring gaskets 13 are slightly crushed when the lid 1a is tightened on the flange 1b of the vessel 1. The lid 1a is attached on the vessel flange 1b by pins, not shown, which are screwed into tapped holes 16 made in the flange 1b and which pass through smooth holes 15 provided in a flange ring of the lid 1a.

These pins are generally in a relatively large number and relatively close to each other, disassembling and reassembling the lid therefore requires unscrewing and screwing of all these pins.

During the tightening and loosening operations, a tension device of a known type, not shown, exerts traction on the pins in order to put them into a pre-stressed condition.

In order to avoid that metal microchips or other solid material particles deposit on the span 21 of the seal gaskets 13 of the vessel flange 1b during screwing or unscrewing of the pins, which may cause leaks, a ring-shaped gasket designated by the general reference 40 is inserted between the vessel flange 1b and the lid 1a at the shoulder 30 of said lid and more particularly at the gap 12, as well as illustrated in FIGS. 2, 5 and 6.

The ring-shaped gasket 40 is formed by a metal strip 41 which preferably has the shape of a flexible ring with a small thickness comprised between 0.3 mm and 1 mm and more particular of the order of 0.5 mm.

Generally, the strip 41 forming the ring-shaped gasket 40 includes a first end side edge 41a intended to bear upon a horizontal wall 17 of the lid 1a and a second end side edge 41b intended to bear upon a horizontal wall 18 of the flange 1b of the vessel 1 when the lid 1a is mounted on the vessel flange 1b, as this will be seen subsequently.

Figure 4:
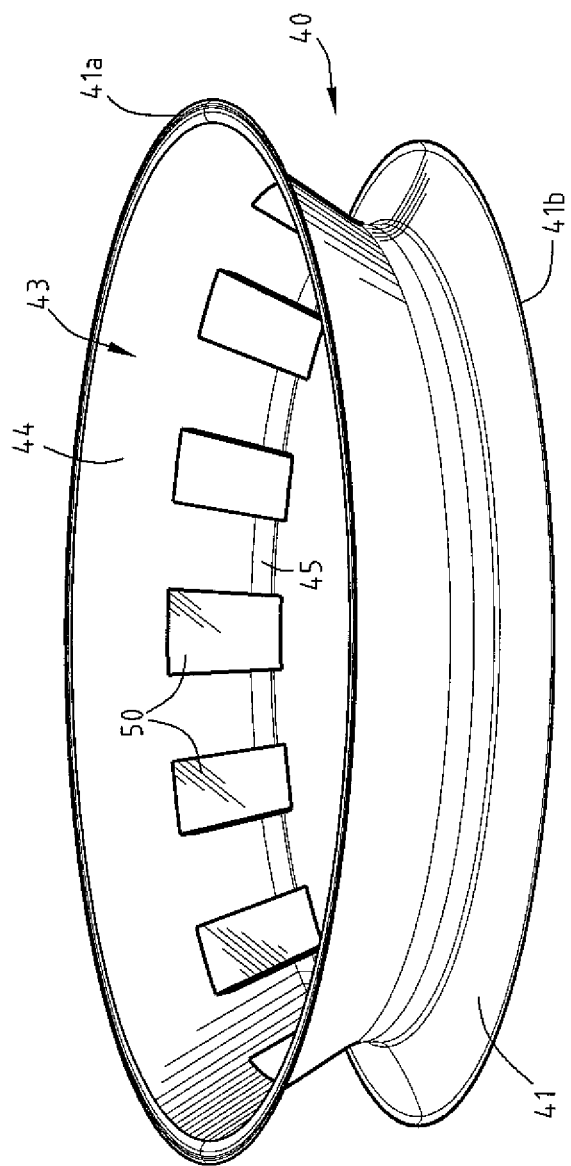
FIG. 4 is a schematic perspective view of a first embodiment of the ring-shaped gasket.

As illustrated in FIG. 4, the strip 41 of the ring-shaped gasket 40 includes self-maintaining members of said gasket 40 on the vertical wall 32 of the shoulder 30 of the lid 1a, when this lid 1a has been removed from the vessel flange 1b and laid on a support, not shown.

The self-maintaining members comprise at least two opposite metal tabs 50 and preferably several metal tags 50 uniformly distributed over the perimeter of the strip 41 of the gasket 40.

The metal tabs 50 are attached on the outer face of the strip 41 intended to be placed facing the vertical wall 32 of the recess 30 and these tabs 50 are attached by welding.

Each tab 50 has a thickness comprised between 0.2 mm and 0.5 mm and preferably of the order of 0.25 mm.

As illustrated in FIG. 4, the strip 41 preferably has an L-shaped cross-section including two walls forming between them an angle, an upper wall 44 and a lower wall 45 with a smaller width than the width of the upper wall 44, respectively.

According to a first embodiment illustrated in FIG. 4, the tabs 50 are attached on the outer face 43 of the upper wall 44 of the strip 41.

Figure 7:
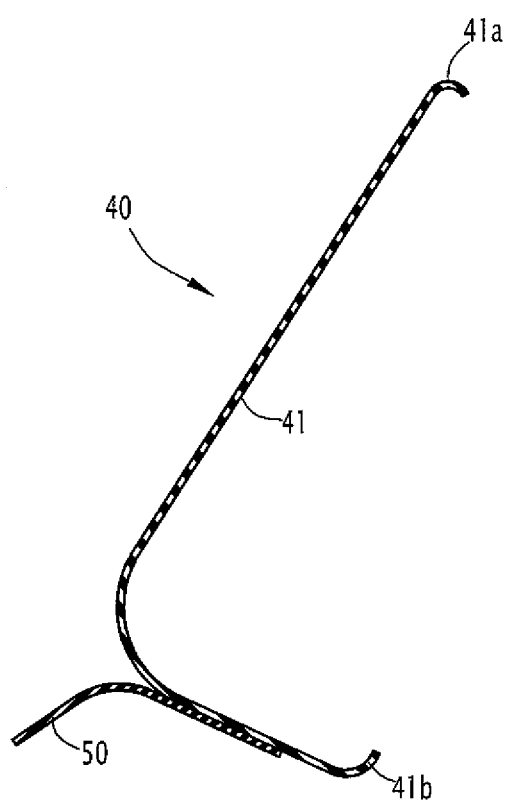
FIG. 7 is a schematic sectional view in a vertical plane of a second embodiment of the ring-shaped gasket.

According to a second embodiment illustrated in FIG. 7, the tabs 50 are attached on the outer face 43 of the lower wall 45 of the strip 41.

Generally, the metal strip 41 forming the gasket 40 may have any other shape such as for example a C-shaped or V-shaped cross-section.

Laying the ring-shaped gasket 40 at the gasket plane 10 between the lid 1a and the vessel flange 1b is carried out in the following way.

During a maintenance operation or an operation for reloading the core of the nuclear reactor, the pins are unscrewed and the lid 1a is removed from the vessel 1. This lid 1a is laid on a support, not shown, so as to allow operators to access the O-ring gasket 13 and possibly proceed with their replacement.

The operators manually place the strip 41 around the vertical wall 32 of the shoulder 30 by applying the upper side edge 41a against the horizontal wall 17 of this shoulder 30. The free edges of the self-maintaining tabs 50 bear upon the vertical wall 32 of the shoulder 30 and ensure that the strip 41 is maintained by buttressing this vertical wall 32. Taking into account the asymmetrical profile of the strip 41 forming the gasket 40 and the weight of this strip, the tabs 50 form elements for blocking and maintaining the gasket 40 in place on the shoulder 30 of the lid 1a.

Next, the lid 1a bearing the ring-shaped gasket 40 is conveyed above the vessel 1b and during this transport, the ring-shaped gasket 40 is only maintained by the tabs 50 without any other element.

The lid 1a is positioned at a determined height of the vessel flange 1b and a cleanliness inspection of the gasket plane 10 is carried out.

Next, and as shown in FIG. 5, the lid 1a is lowered onto the vessel so that the end side edges 41a and 41b of the strip 41 come into contact with a horizontal wall, the horizontal wall 17 of the shoulder 30 of the lid 1a and the horizontal wall 18 of the recess 40 of the vessel flange 1a, respectively.

Thus, and before tightening the pins, the strip 41 prevents any migration of microparticles or foreign bodies of solid material towards the inside of the vessel before putting the O-ring gaskets 13 into contact on the span 21.

The lid 1a is then attached on the vessel flange 1b, by tightening the pins, not shown.

Upon tightening the lid 1a on the vessel 1, the strip 41 forming the ring-shaped gasket 40 is gradually crushed as shown in FIG. 5.

The ring-shaped gasket 40 because of the contacts of the side edges 41a and 41b on the horizontal wall 17 and 18 of the lid 1a and of the vessel flange 1b respectively and also because of the contact of the generatrix 41c on the vertical wall 32 of the shoulder 30 by crushing of the tabs 50, therefore ensures confinement of the gasket plane 10 preventing the migration of microchips or of any other particles towards said gasket plane 10 and towards the inside of the vessel.

The ring-shaped gasket 40 remains in place during the whole operating cycle of the nuclear reactor following its placement and is replaced during the next cycle.

Preferably, the strip 41 of the ring-shaped gasket 40 is in stainless steel.

During a new removal of the lid 1a, the ring-shaped gasket 40 may easily be withdrawn without any special operation. Indeed, during a shut-down, the gasket may be taken off by hand, with view to its replacement. The lid is then placed on its stand, removal of the gasket does not have any particular difficulties and does not generate any pollution in particular at the vessel or the pool of the reactor.

The ring-shaped gasket according to the invention therefore gives the possibility of securing and confining the gasket plane of a vessel of a nuclear reactor during an operation for closing this vessel in order to avoid any intrusion of microchips or foreign bodies between the gaskets and the span of these gaskets before and during the tightening of the pins ensuring the attachment of the lid on the vessel flange of the nuclear reactor.

The ring-shaped gasket has the advantage of being able to be easily laid on the shoulder of the lid of the vessel of the nuclear reactor without any particular attachment operation.

What is claimed is:

1. A method for securing and confining a gasket plane of a vessel of a nuclear reactor during an operation for closing the vessel in order to prevent a migration of solid material particles towards an inside of the vessel, the gasket plane being formed by a ring-shaped recess on a flange of the vessel and by a ring shaped shoulder on a lid of the vessel, the ring shaped recess on the flange and the shoulder facing each other and each including a vertical wall delimiting between them a gap after laying the lid on the vessel flange, the shoulder including a horizontal wall provided with two O-ring seal gaskets wherein after having disassembled the lid and laying the lid on a support, the method comprises the following steps:

placing around the shoulder of the lid a ring-shaped gasket formed by a metal strip maintained on the vertical wall of the shoulder by self-maintaining members firmly attached to the metal strip;

placing the lid bearing the ring-shaped gasket above the vessel by positioning it at a determined height and performing a cleanliness inspection of the gasket plane;

lowering and laying the lid on the vessel so that end side edges of the metal strip come into contact with respective horizontal walls of the lid and of the vessel flange;

attaching the lid on the vessel flange; and leaving the ring-shaped gasket in place during a whole operating cycle of the reactor.

2. A ring-shaped gasket for securing and confining a gasket plane of a vessel of a nuclear reactor during an operation for closing the vessel in order to prevent a migration of solid material particles towards the inside of the vessel, the gasket plane being formed by a ring-shaped recess made on a flange of the vessel and by a ring-shaped shoulder made on a vessel lid, the recess and the shoulder facing each other and each including a vertical wall delimiting between the recess and the shoulder a gap, the shoulder including a horizontal wall provided with two O-ring seal gaskets, the gasket comprising:

a metal strip including two end side edges, each edge capable of bearing upon respective horizontal walls of the lid and of the vessel flange, and self-maintaining members of the ring-shaped gasket bearing upon the vertical wall of the shoulder of the lid.

3. The ring-shaped gasket according to claim 2 wherein the self-maintaining members include at least two opposite metal tabs attached on an outer face of the metal strip, the metal tabs facing the vertical wall of the shoulder of the lid.

4. The ring-shaped gasket according to claim 3 wherein each metal tab is attached on the outer face of the strip by welding and has a thickness between 0.2 mm and 0.5mm.

5. The ring shaped gasket according to claim 4 wherein the metal tab thickness is 0.25 mm.

6. The ring shaped gasket according to claim 4 wherein the metal tab thickness is 0.5 mm.

7. The ring-shaped gasket according to claim 2 wherein the self-maintaining members include several metal tabs uniformly distributed over a perimeter of the metal strip and attached on an outer face of the metal strip facing the vertical wall of the shoulder of the lid.

8. The ring-shaped gasket according to claim 2 wherein the metal strip of the ring-shaped gasket has the shape of a flexible ring with a thickness between 0.3 mm and 1 mm.

9. The ring-shaped gasket according to claim 2 wherein the metal strip of the ring-shaped gasket has an L-shaped cross-section including two walls, an upper wall and a lower wall, the upper wall and the lower wall forming an angle between them, the upper wall having an end side edge bearing upon the horizontal wall of the lid and the lower wall having a smaller width than the upper wall, the lower wall having an end side edge bearing upon the horizontal wall of the vessel flange.

10. The ring-shaped gasket according to claim 9 wherein the self-maintaining members include metal tabs attached on an outer face of the upper wall of the metal strip.

11. The ring-shaped gasket according to claim 9 wherein the self-maintaining members include metal tabs attached on an outer face of the lower wall of the strip.

* * * * *